United States Patent [19]

Kullmann et al.

[11] 4,085,287
[45] Apr. 18, 1978

[54] DATA TRANSMITTING APPARATUS

[75] Inventors: Donald J. Kullmann, Tallassee; Daniel A. Seltzer, Montgomery; Raymond L. Kirby, Tallassee, all of Ala.

[73] Assignee: Neptune Water Meter Company, Tallassee, Ala.

[21] Appl. No.: 642,574

[22] Filed: Dec. 19, 1975

[51] Int. Cl.² .................................. H04L 17/00
[52] U.S. Cl. .................. 178/66 R; 179/15 BY; 340/206; 340/256
[58] Field of Search ............ 340/146.1 D, 146.1 AL, 340/182, 149 R, 186, 187, 203, 206, 346, 34 B, 353, 356, 365 R; 179/20 D, 15 BS, 15 BY; 178/50, 53, 53.1, 66 R, 68

[56] References Cited

U.S. PATENT DOCUMENTS

| | | | |
|---|---|---|---|
| 3,040,130 | 6/1962 | Hughes | 178/53 X |
| 3,482,044 | 12/1969 | Kaneko | 178/53 |
| 3,541,524 | 11/1970 | Blasbalg et al. | 178/50 X |
| 3,806,904 | 4/1974 | Weinberger et al. | 340/206 |
| 3,883,866 | 5/1975 | Kneeland | 340/356 |
| 4,006,302 | 2/1977 | Reisinger | 178/50 |

*Primary Examiner*—Benedict V. Safourek
*Attorney, Agent, or Firm*—Cooper, Dunham, Clark, Griffin & Moran

[57] ABSTRACT

This data transmitting apparatus is illustrated in a system for the remote reading of water meters. It includes a passive transmitter operated by the meter, a receiver including a source of energy, and means for connecting the receiver and its energy source to the transmitter. The receiver includes electrical loading means enabling it to read a submerged meter. The receiver is compatible with one type of transmitter having 14 output wires and with another type having only three. The data, e.g., a reading of a meter, is transmitted as binary data in a word of 16 characters, each comprising four bits. A pulse coding system is insensitive to noise, and includes a first bit detector for each character, and a final character detector for each word. The receiver detects open circuits in the transmitter and produces an error signal in response to such open circuits. The receiver and transmitter may be coupled through a manual connector. The receiver may be a portable unit and a movable connector element on the receiver may cooperate with a fixed connector element mounted on an exterior wall of a building. Delayed start means prevents beginning of a reading until transients due to coupling of the connector elements have died out.

30 Claims, 18 Drawing Figures

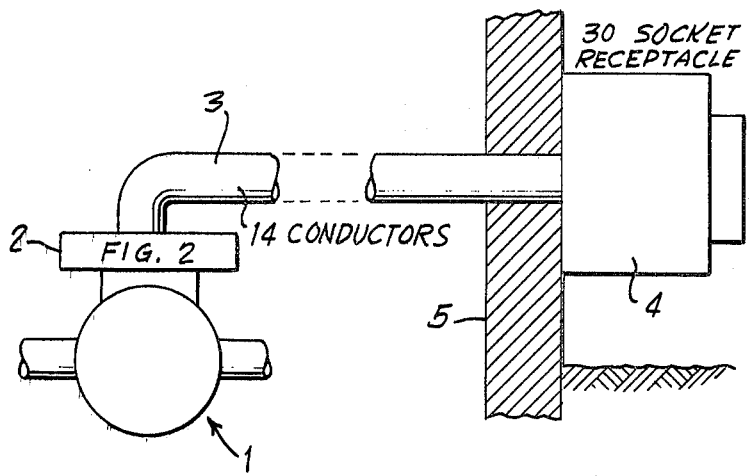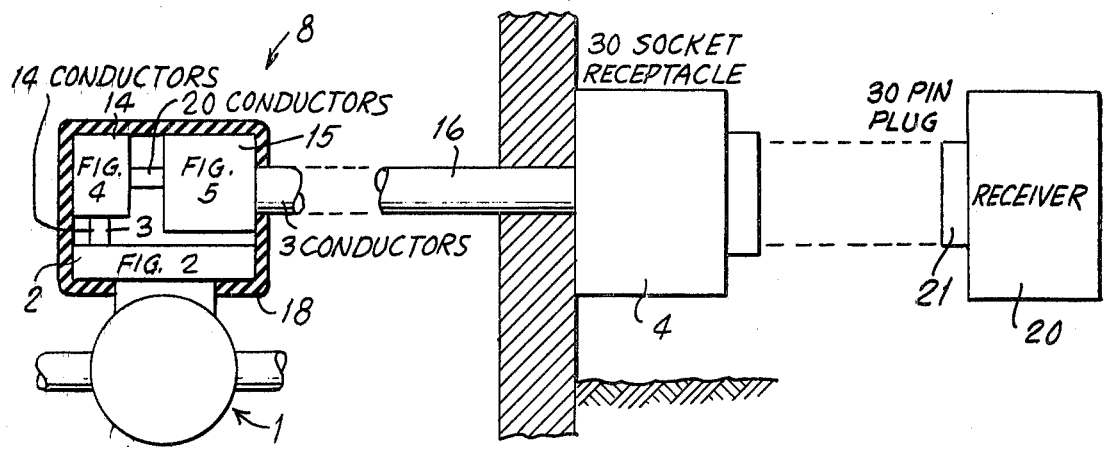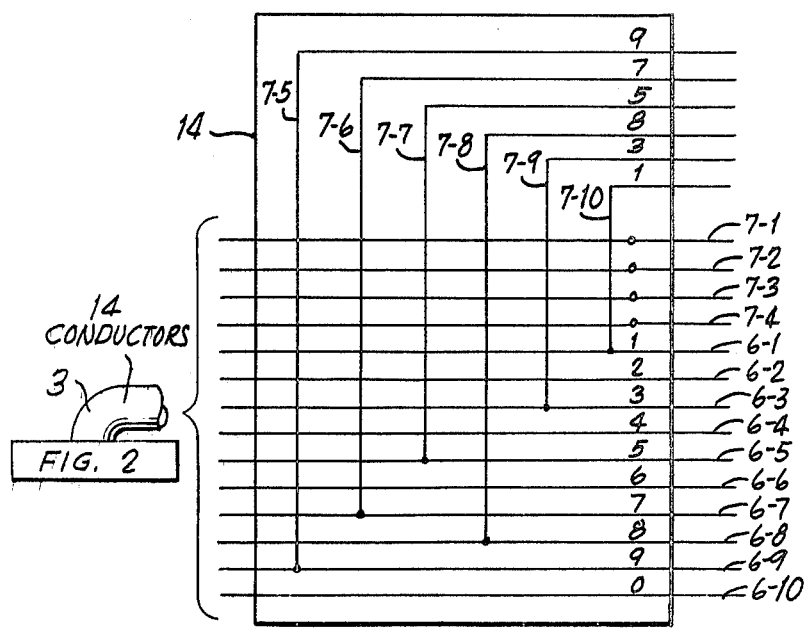

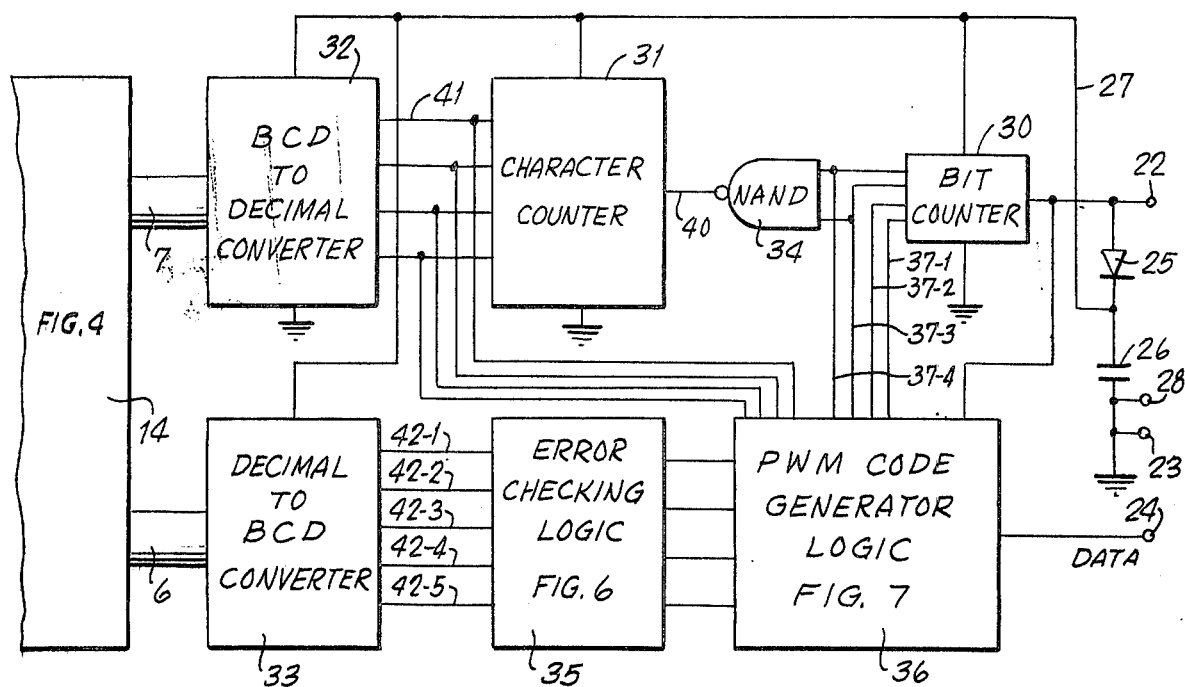
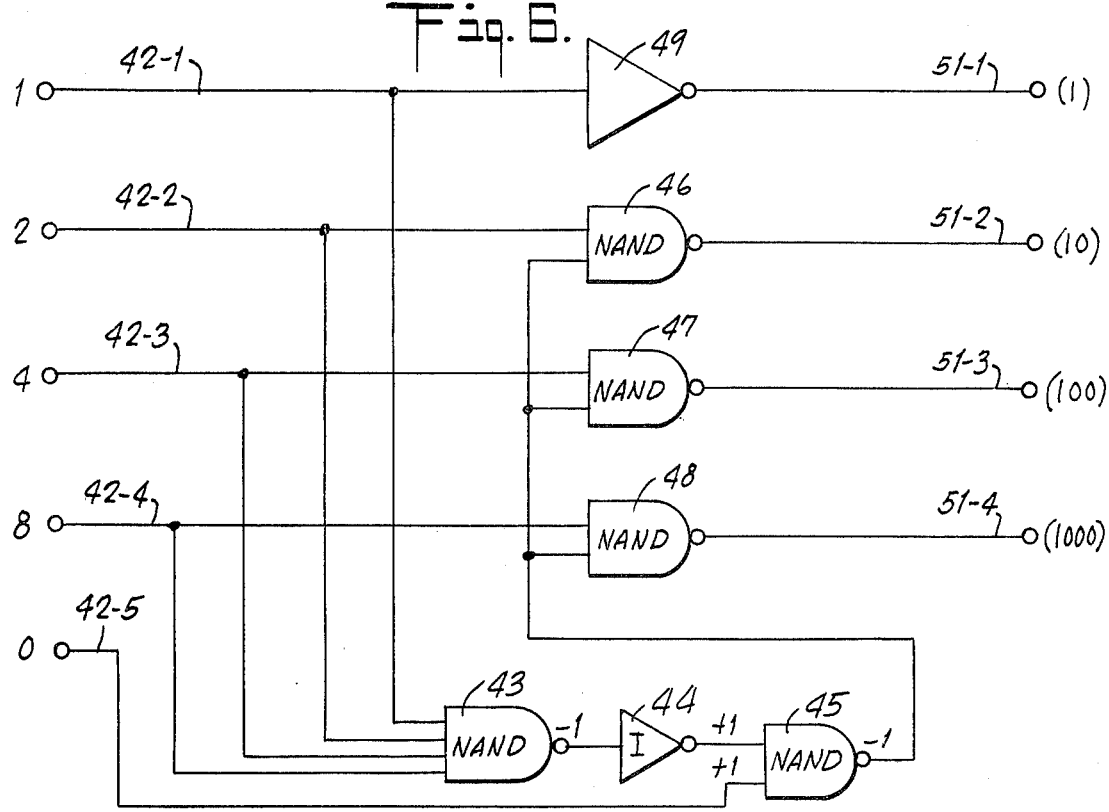

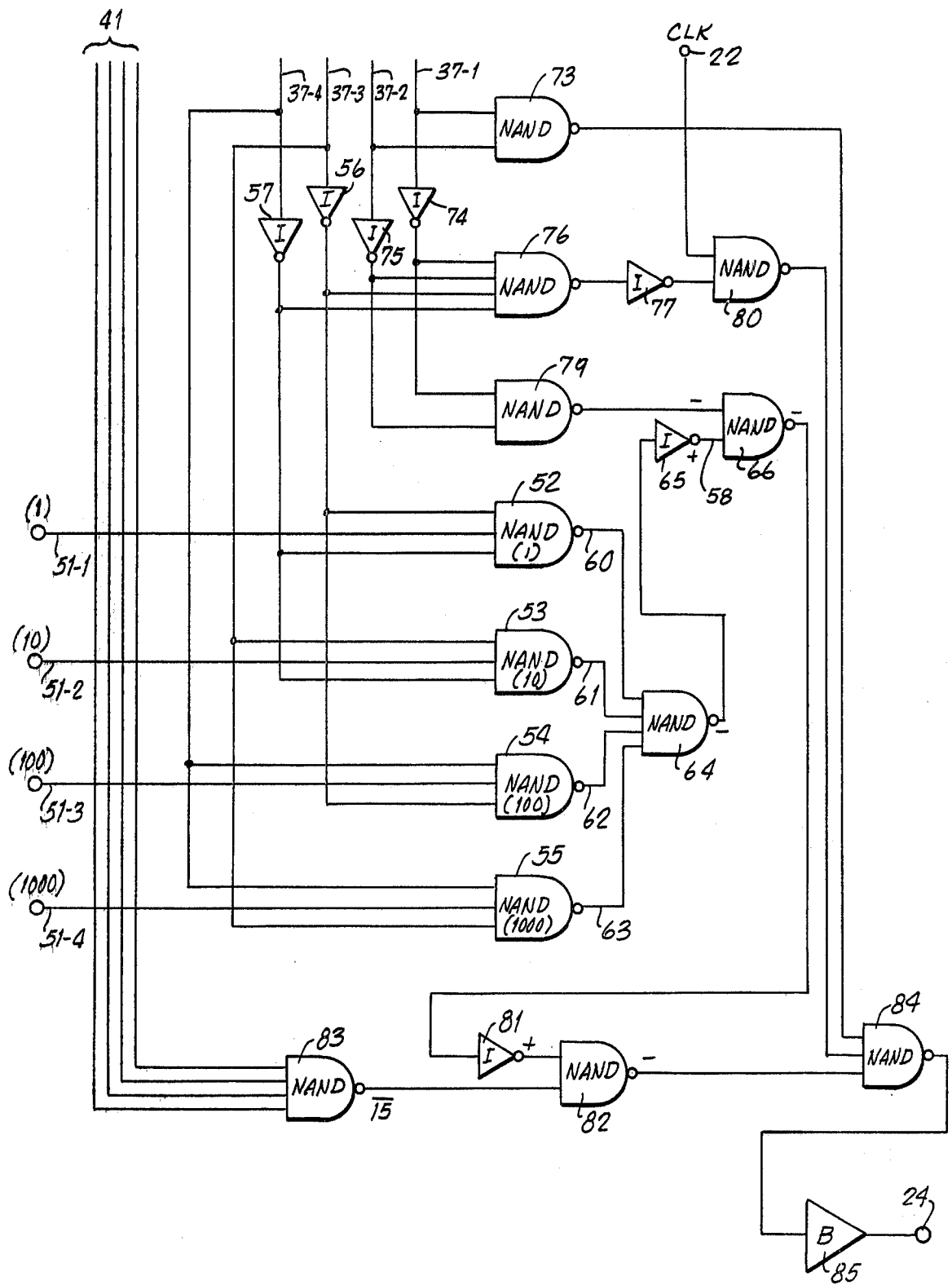

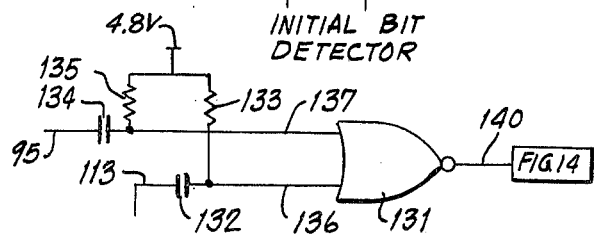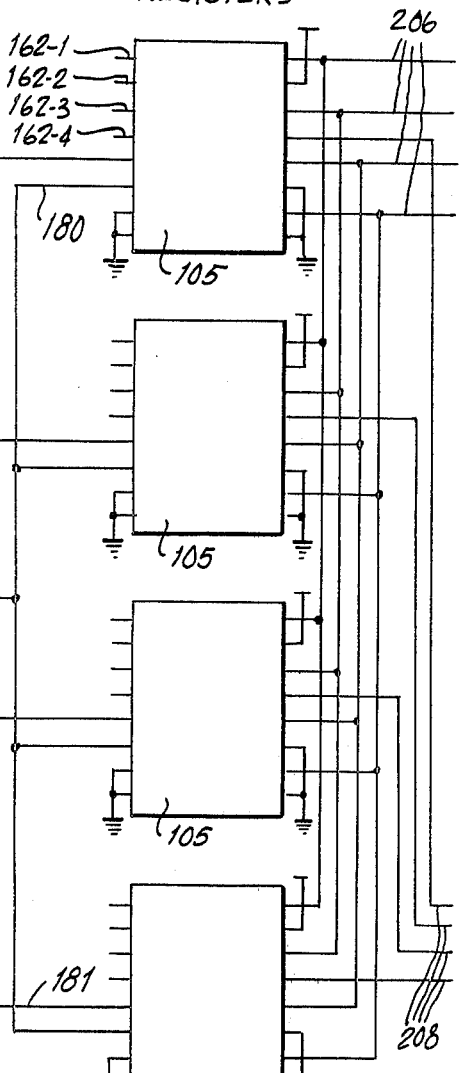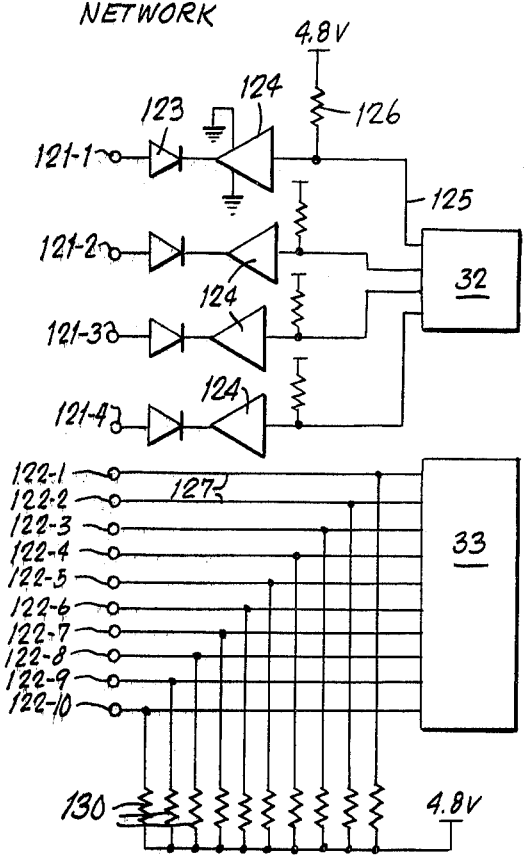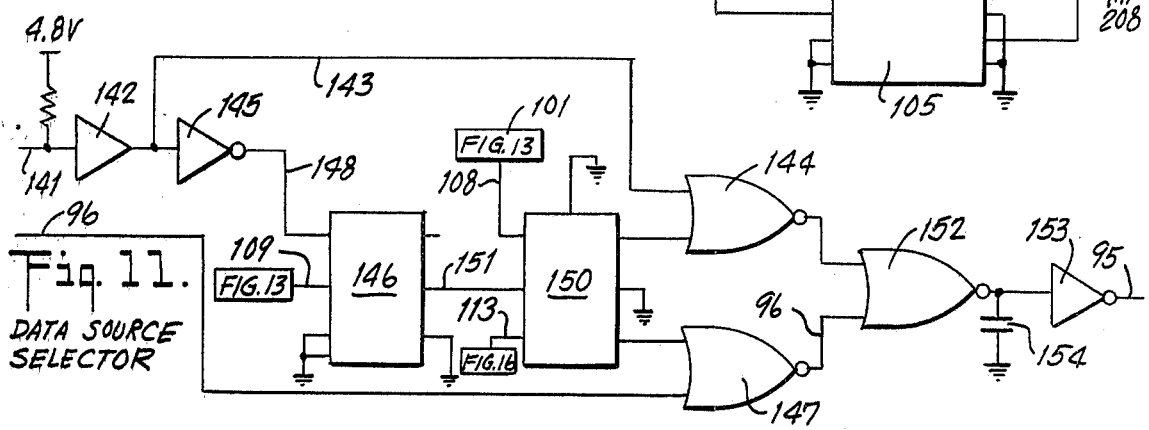

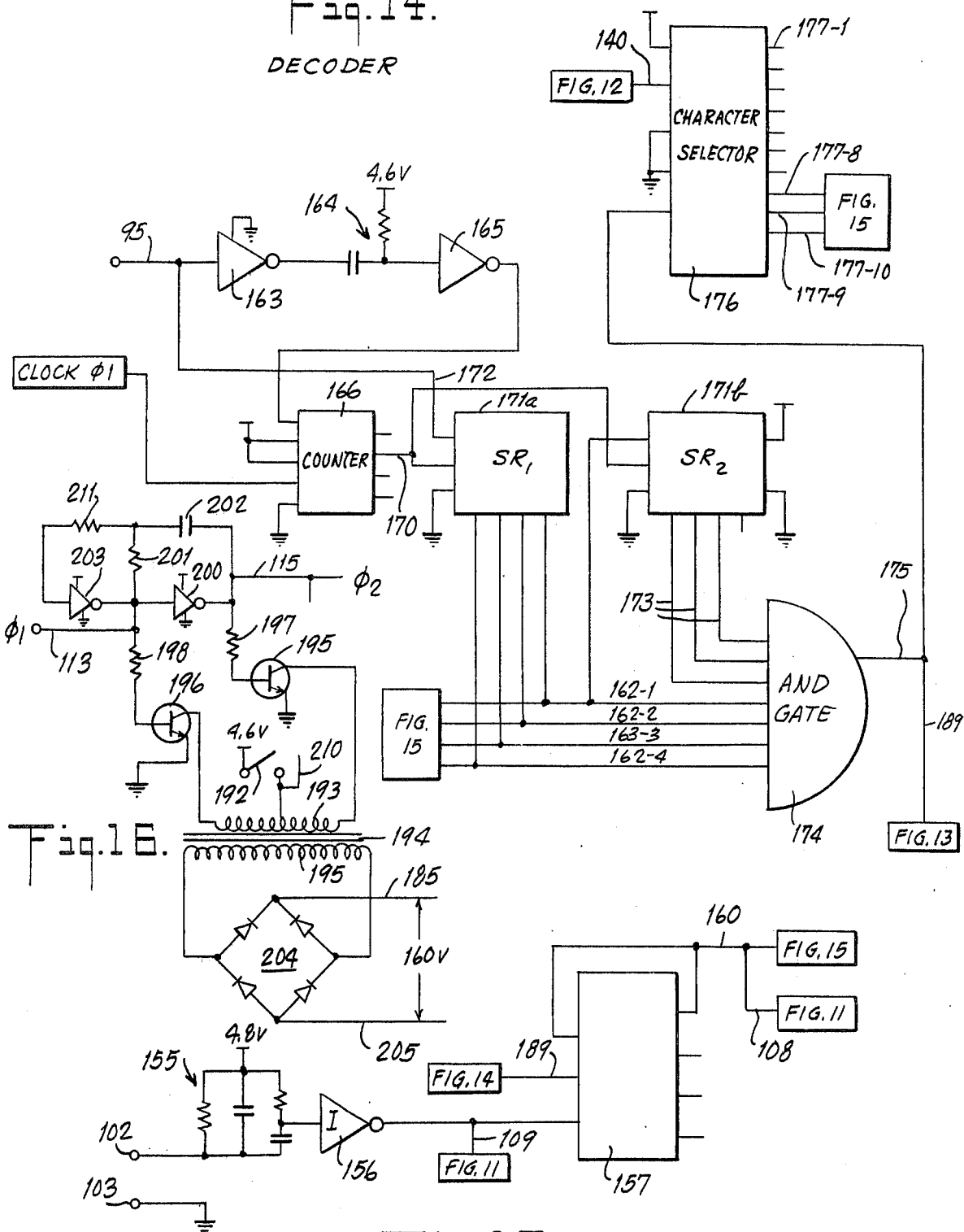

DATA TRANSMITTING APPARATUS

BRIEF SUMMARY OF THE INVENTION

The data transmitting apparatus includes a system for coding data for transmission as a series of electrical pulses, so that the data is not obscured by extraneous noise. The system is illustrated as applied to binary coded decimal data, which is transmitted in words of 16 characters each, each character comprising four BCD bits. The first one-quarter and the last one-quarter of each bit are always of opposite polarities, except that the second one-eighth of the initial bit in each character is reversed in polarity. The middle one-half of each bit is utilized as the data carrying portion of the bit, and is shifted between two potential values, one of which indicates a binary "0" and the other indicates a binary "1".

The number of characters in each word (in the illustrated embodiment, 16) should be greater than the number required for the transmission of the available data (in the illustrated embodiment, 10). Thus, there are left six characters in each word which do not have any data transmitting function. The last character in each word is coded as a binary 15 (1111) to indicate to the receiver that the word has come to an end. If the transmitter fails to generate a complete word of 10 characters, then an error signal is generated as a binary 14 (1110) in place of any missing character. The blank characters between the 10th and the 16th are transmitted as binary 14's but do not cause an error signal.

A delayed start mechanism is provided so that after the initial connection is made between the transmitter and receiver, no data is transmitted for a time long enough to allow any transients originating concurrently with the completion of the connection to die out.

The transmitter employed has no energy source. The receiver includes a power supply and a clock oscillator driven by the power supply. The transmitter includes a switch type decimal indicator mechanism and may also include an encoder for converting the indications of the switch mechanism to serial BCD pulses. When the transmitter includes an encoder, the encoder receives power from a rectifier means fed by clock pulses from the transmitter.

Those meters which include encoders are also provided with meter identification circuits so that each word transmitted by the transmitter includes a series of meter identifying digits and a series of digits representing the reading of the meter.

The receiver is constructed to be compatible with: (1) an existing, widely used switch type transmitter which does not include an encoder and has 14 active wires in its connector element; and (2) a transmitter disclosed herein, which includes an encoder, and has only three active wires in its connector. In order to secure that compatibility, the receiver is provided with an encoder unit, which operates only when its connector element encounters a 14 wire transmitter.

The older type of transmitter, employing 14 wires, is not waterproof, and is sometimes located in a pit, sump, or the like, where it may become submerged and remain submerged for long periods of time, thereby connecting its contact elements to ground through water which may be polluted or salt and thus have an indeterminate electrical resistance. The reading of such submerged meters is accomplished in the apparatus of the present invention by electrically loading the input circuit of the encoder in the receiver unit, so that it can distinguish between two contacts which are in direct engagement with each other and two contacts which are connected only through a path of relatively greater resistance.

DRAWINGS

FIG. 1 is a somewhat diagrammatic view of a prior art water meter installation which may be read by the apparatus of the invention.

FIG. 3 is a view similar to FIG. 1, showing a water meter installation with a transmitter constructed in accordance with the present invention.

FIG. 4 is a diagrammatic view of a meter identifying network employed in the apparatus of FIG. 2.

FIG. 5 is a wiring diagram of an encoder unit for converting the output of the switch type transmitter of FIG. 2 into a BCD word.

FIG. 6 is a wiring diagram of an error checking logic circuit shown as a block in FIG. 5.

FIG. 7 is a wiring diagram of a pulse modulation code generator shown as a block in FIG. 5.

FIG. 10 is a wiring diagram of an electrical loading network shown as a block in FIG. 9.

FIG. 11 is a wiring diagram of a data source selector circuit shown as a block in FIG. 9.

FIG. 12 is a wiring diagram of an initial bit detector circuit appearing in FIG. 9.

FIG. 13 is a wiring diagram of a delayed start circuit shown as a block in FIG. 9.

FIG. 14 is a wiring diagram of a decoder circuit shown as a block in FIG. 9.

FIG. 15 is a wiring diagram of a storage register circuit shown as a block in FIG. 9.

FIG. 16 is a wiring diagram of a power supply and clock circuit shown as a block in FIG. 9.

DETAILED DESCRIPTION

FIG. 1

Figure 2:
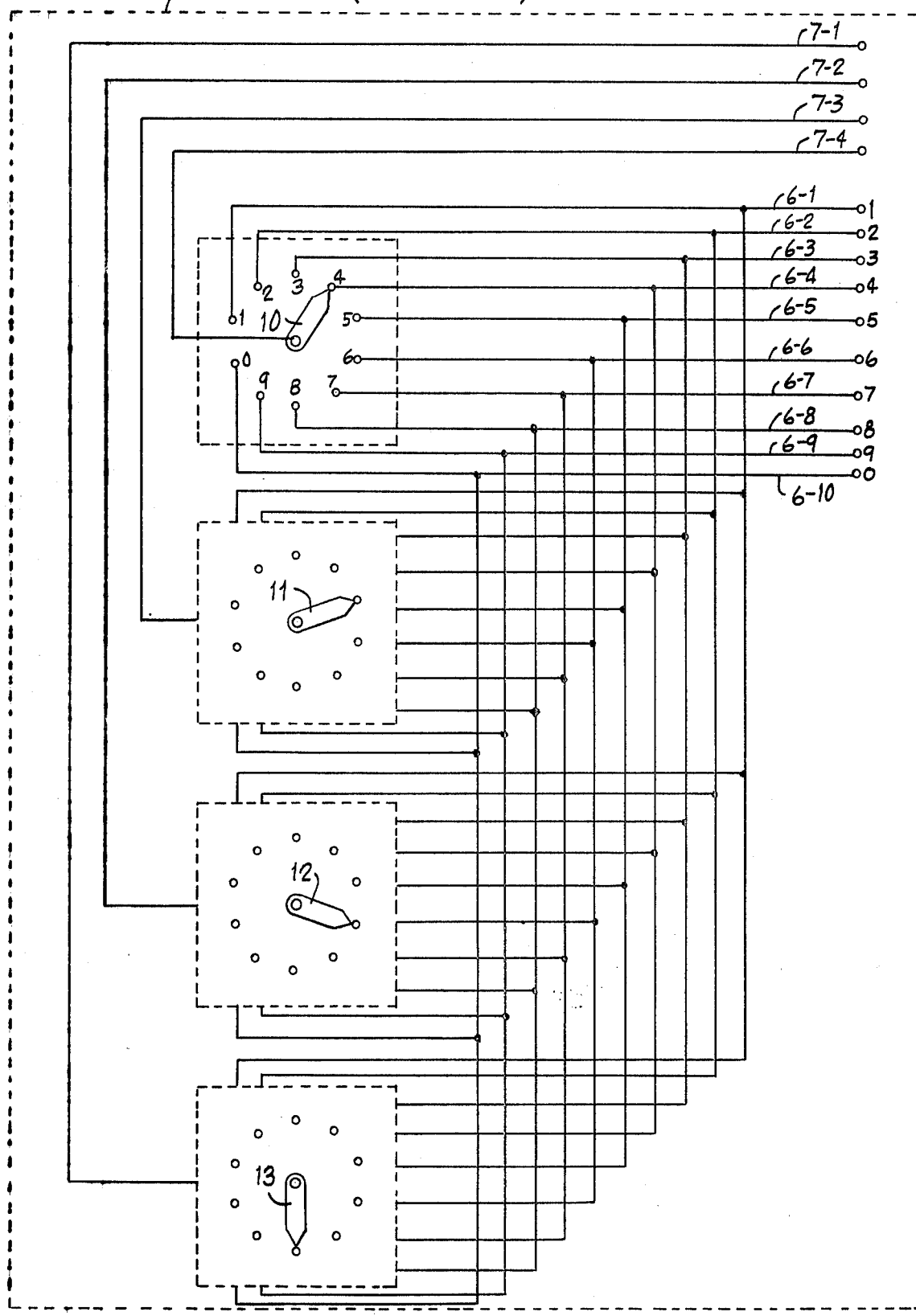
FIG. 2 is a wiring diagram showing a four digit switch type transmitter used in the apparatus of FIG. 1.

This figure illustrates diagrammatically a water meter installation including a meter 1 driving a digit selector switch 2 shown in greater detail in FIG. 2 and having a fourteen conductor cable 3 leading from the switch 2 to a fixed electrical receptacle 4 mounted on the outside of an external wall 5 of the building in which the meter 1 is located.

The system shown in FIG. 1 is in widespread use. It enables the reading of a meter without having access to the interior of the building in which the meter is located.

FIG. 2

This figure illustrates diagrammatically a digit selector switch 2 which may be used in the system of FIG. 1. The meter may be of the usual cyclometer type and drives four switch fingers 10, 11, 12 and 13, one for each ...mal order of the meter, each of which moves across ...tionary contacts. ...e 4 stationary contacts of ...en of the switches 10, 11, 12 and 13 are connected to a set of 10 digital output wires 6-1 to 6-10. The switch fingers 10, 11, 12 and 13 are each connected to one of a set of four wires 7-1 to 7-4. The 14 wires numbered 6 and 7 in FIG. 2 are connected to the receptacle 4 shown in FIG. 1 which serves as a stationary connector element of a meter reading system.

When it is desired to read the meter 1, a receiver unit (not shown) is plugged into the receptacle 4. The prior art receiver has a set of four switches for selectively energizing the wires 7. When any wire 7 is energized, its associated switch 10, 11, 12 or 13 will convey electrical energy to one only of the 10 output wires 6 which energizes a suitable digit indicator or recorder in the receiver unit. Although only 14 wires are used in the meter reading system of FIGS. 1 and 2, the receptacle 4 commonly is provided with 30 sockets for receiving up to 30 contact pins on the receiver unit.

FIGS. 3 AND 4

These figures illustrate diagrammatically a meter reading system constructed in accordance with the present invention, which includes a meter 1 and a transmitter 8 comprising a selector switch 2. The transmitter 8 has the 14 output conductors of switch 2 (identified for convenience as 3) connected to a network 14 illustrated in FIG. 4 and thence through 20 conductors 6-1 to 6-10 and 7-1 to 7-10 to an encoder 15 illustrated in FIG. 5. The switch 2, network 14 and encoder 15 are mounted as a hermetically sealed transmitter unit on the top of the meter 1. The sealed enclosure of this unit is indicated schematically in the drawing at 18. A three conductor cable 16 connects the output of the encoder 15 to a 30 socket receptacle mounted on the outside of an external wall of the building. Note that the connection from the meter unit to the receptacle 4 is considerably simpler than in FIG. 1, since it requires only a three conductor cable instead of a 14 conductor cable.

The network 14 includes six conductors numbered 7-5 through 7-10, which are connected to six of the digit indicating wires 6-1 to 6-10. The wires 7-5 to 7-10 provide a meter identification circuit, as will be described more fully below.

A receiver unit 20, which is compatible with both the meter system of FIG. 1 and the meter system of FIG. 3, includes a 30 pin plug 21, which mates with the 30 socket receptacle 4. The particular number of plugs and sockets is significant only in that it must be greater than the sum of the number of sockets (14) used in the system of FIG. 1, and the number of sockets (4) used in the system of FIG. 3.

FIGS. 5-8

Figure 8:
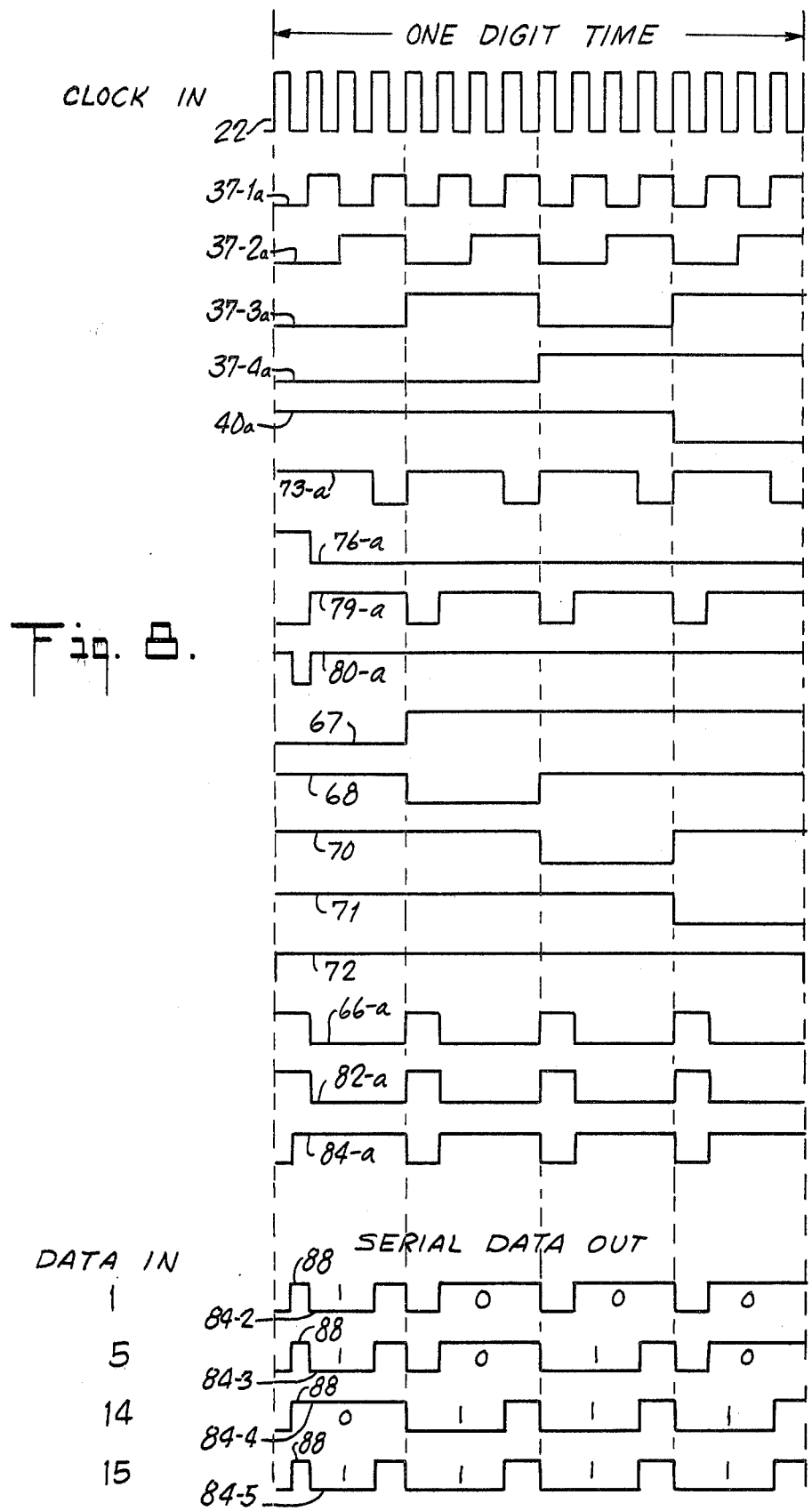
FIG. 8 is a graphical illustration of the signals appearing at various points in FIGS. 5-7 during the reading of a meter.

The encoder of FIG. 5 has three terminals 22, 23 and 24 which are connected to the three conductors in the cable 16 of FIG. 8. Terminal 22 is a clock pulse input terminal. Terminal 23 is connected to ground and terminal 24 is a data output terminal. A fourth terminal 28 is connected to terminal 23 at the connector, for a purpose to be described later. A diode 25 and a capacitor 26 are connected in series between the clock pulse input terminal 22 and ground. The diode 25 rectifies a portion of the clock pulse input and charges the capacitor 26 so that a line 27 connected to the common terminal of diode 25 and capacitor 26 may serve as the positive DC supply line for a binary counter 30, a character counter ... BCD-to-decimal converter 32, and a decimal-to-BCD converter 33. The encoder of FIG. 5 also includes NAND circuit 34, an error checking logic circuit 35, shown in detail in FIG. 6, and a code generator logic circuit 36 shown in detail in FIG. 7. The BCD-to-decimal converter 32 has ten output conductors cabled together and identical with the wires numbered 7-1 to 7-10 in FIG. 4. The decimal-to-BCD converter 33 has 10 input conductors identical with the conductors numbered 6-1 to 6-10 in network 14 of FIG. 4.

The binary counter 30 counts clock pulses received at terminal 22 and shown at 22 in FIG. 8. The counter 30 has four output lines 37-1, 37-2, 37-3 and 37-4, each representing a binary order, 37-1 being the lowest binary order and 37-4 being the highest. Hence, the counter 30 counts 16 clock pulses (four bits) and then starts over. The waveforms on the output lines 37-1 to 37-4 are illustrated in FIG. 8 at 37-1a to 37-4a. The NAND circuit 34 has two input terminals connected to the two highest order lines 37-3 and 37-4. It produces at its output terminal 40 a signal varying as shown graphically at 40a in FIG. 8. That signal remains at its higher binary value for the first 12 clock pulses (three bits) and then shifts to its lower binary value for the last bit of each character. Hence, the counter 30 counts the 16 pulses which comprise the four bits of a single character and the NAND circuit 34 transmits an output pulse through terminal 40 to register the completion of a character.

The counter 31 operates in a manner similar to the counter 30, and produces on its four output lines 41, signals which count the 16 characters in a word, identifying each character by a binary coded decimal number. The output lines 41 are connected to the input of the BCD-to-decimal converter 32, whose 10 output lines are in turn connected to the lines identified as 7-1 to 7-10 in FIG. 4. Thus, the counter 30, NAND circuit 34, counter 31 and converter 32 cooperate to sequentially energize the lines 7-1 to 7-10, each for a time corresponding to one character interval as shown in the graphical FIG. 8. This takes place during the first ten character intervals in a word of 16 character intervals (see FIG. 18). The remaining six character intervals are not utilized for data transmission in the system shown and none of the lines 7 is energized during those intervals.

Figure 18:
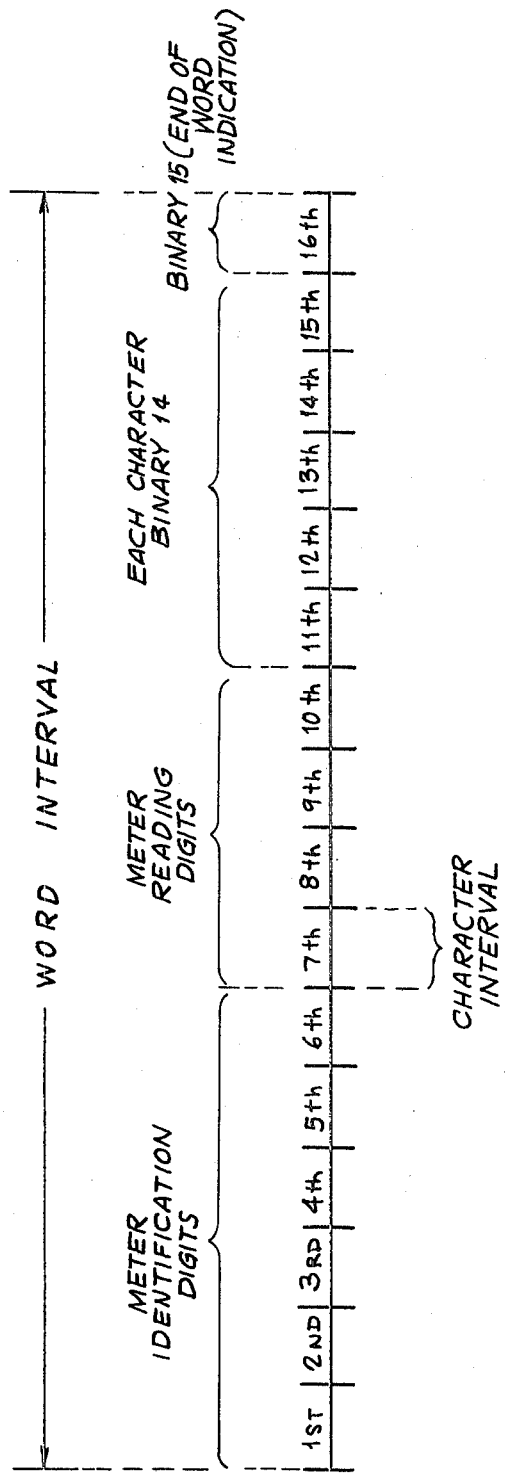
FIG. 18 is a graphical illustration of one word interval and its component character intervals.

FIG. 18 illustrates a single word interval in the illustrated apparatus, and shows that each word interval is divided into sixteen character intervals. The first six character intervals are utilized for meter identification digits. The next four character intervals comprise the meter reading digits. The next five character intervals are not utilized in the apparatus illustrated, but could be utilized if it were desired to transmit a reading of more than four digits. The 16th character interval always appears as a binary 15 (1111), and is used as an indication of the end of the word, so that the receiving apparatus is prepared to receive a new word.

During the first six character intervals shown in FIG. 18, the wires 7-5 to 7-10 of FIG. 4 are energized in sequence, and thereby energize sequentially six of the data output wires 6-1 to 6-10, one such wire being energized during each character interval, to identify the particular meter being read. In the example illustrated by the connections in FIG. 4, the serial number of the meter is 975831.

Thereafter, the lines 7-1 to 7-4 are sequentially energized. Each of those lines is connected through its associated switch 10, 11, 12 or 13 (FIG. 2) to one of the decimal digit output lines 6-1 to 6-10, depending upon the angular position of the switch which is energized. These angular positions correspond to the reading of the meter, which is thereby read out on the lines 6-1 to 6-10.

The signals on the decimal indicating lines 6 are transmitted to the decimal-to-BCD converter 33, where they are converted to BCD code on five output lines 42-1 to 42-5, representing respectively the lowest four orders of binary digits and zero. The lines 42 are connected to an error checking logic circuit 35, shown in detail in FIG. 6.

The binary "1" input 42-1 is connected to the input of an inverter 49 and the output is connected to a BCD binary "1" output terminal 51-1. The BCD inputs 42-2, 43-3 and 43-4, representing respectively binary 10, 100, and 1000, or decimal 2, 4 and 8, are respectively connected to one input of NAND circuits 46, 47, 48. The outputs of those NAND circuits are connected to the BCD outputs 51-2, 51-3 and 51-4, respectively the binary 10, 100, and 1000 outputs. The BCD input 42-5, which is the zero input, is connected to one input of a NAND circuit 45 whose output is connected to the other inputs of the NAND circuits 46, 47 and 48.

The BCD inputs 42-1, 42-2, 42-3 and 42-4 are also connected to the four inputs of a NAND circuit 43, whose output is connected through an inverter 44 to the other input of NAND circuit 45.

The signals appearing at the BCD inputs 42 are inverted. In other words, a positive potential represents a zero and a negative potential indicates a binary "1". As long as any signal appears on one or more of the binary inputs 42-1 to 42-4, that signal passes through the logic network of FIG. 6 and appears at the corresponding output 51-1 to 51-4. To indicate a zero, there must be no signal at the inputs 42-1 to 42-4 and a positive signal at 42-5. In that event, the NAND circuit 43 has a negative output signal and the inverter 44 a positive output. NAND circuit 45 receives positive signals at both its inputs and thus has a negative output signal and the three NAND circuits 46, 47 and 48 have negative output signals. Input 42-1 has a positive potential and the inverter 49 converts that to a negative output signal at terminal 51-1. If there is an open circuit in the digit selector switch 2, which may occur, for example, at one of the switch contacts 10, 11, 12 or 13, then when that switch contact is energized, there will be no signal at any of the input terminals 42. The NAND circuit 43 then produces a negative output signal and inverter 44 produces a positive output signal, since terminal 42-5 is also positive, the NAND circuit 45 produces a negative output signal and the three NAND circuits 46, 47 and 48 all produce positive output signals indicating a binary 14 at the outputs 51-2, 51-3 and 51-4.

FIG. 7

PULSE WIDTH MODULATION CODE GENERATOR

The parallel data inputs 51-1 to 51-4 carry four bits of binary coded decimal data from the error checking circuits of FIG. 6. In FIG. 7, four bits of parallel data during each character interval are combined with pulses from the bit counter 30 to produce a sequence of four serial pulses of modulated data at an output 58. The data at 58 are further combined with other signals from the bit counter 30 and from the clock to add beginning and ending signals for each bit, and marker pulses indicating the beginning of each new character.

Each of the data inputs 51-1 to 51-4 is connected to one of four NAND circuits 52, 53, 54, and 55, each having three inputs. As illustrated in FIG. 8, the four bit times in one character interval are distinguished by four different combinations of the 37-3 and 37-4 outputs of the bit counter 30. The NAND circuit 52 has one input connected to data input 51-1 and two other inputs connected through inverters 56 and 57 to the outputs 37-3 and 37-4. It may be seen from FIG. 8 that the inverted signals from the outputs 37-3 and 37-4 are both positive only during the first of the four bit intervals, which together constitute one character interval. The NAND circuit 52 produces a positive output signal except when all three of its inputs are positive. This can occur only during the first bit interval, if the NAND circuit 52 then receives a positive signal on the line 51-1. In a similar fashion, the NAND circuit 53 has two timing inputs respectively receiving the direct signal from 37-3 and the signal from 37-4, as inverted by inverter 57. It may be seen from FIG. 8 that these two signals are both positive only during the second of the four bit intervals in each character interval. Hence, the NAND circuit 53 can produce a negative output signal at 61 only during the second bit interval, and only if it is receiving a positive signal from input 51-2 during that interval. The two timing inputs of the NAND circuit 54 respectively receive the signal from 37-3 after it is inverted by inverter 56 and the direct signal from 37-4. Hence, it can produce a signal on the line 62 only during the third of the four bit intervals. Similarly, the NAND circuit 55 has its timing inputs connected directly to the outputs 37-3 and 37-4 and can produce a signal on the line 63 only during the fourth bit interval, if it then receives a signal from the line 51-4.

The signals at 51-1 to 51-4 remain constant throughout each character interval, and are sampled sequentially by the timing logic from the pulses generated by the counter 30 on its outputs 37-3 and 37-4.

The outputs of the NAND circuits 52, 53, 54 and 55 are combined in the NAND circuit 64 whose output is inverted in an inverter 65 and supplied to one input 58 of a two input NAND circuit 66. The signal received at input 58 includes in serial BCD form the data received on the parallel BCD lines 51-1 to 51-4. The signal at the input 58 of NAND circuit 66 in response to a binary "1" at input 51-1 is shown on the line 67 in FIG. 8. The corresponding signals for binary 2, 4 and 8 on inputs 51-2, 51-3 and 51-4, respectively, are shown in the lines 68, 70 and 71 in FIG. 8. The signal for a "0" count on the input lines 51-1 to 51-4 is shown at line 72 in FIG. 8.

The signals on outputs 37-1 and 37-2 of counter 30, shown at 37-1a and 37-2a in FIG. 8, are supplied to the two inputs of a NAND circuit 73 where they are combined to produce an output signal as illustrated in the line 73a, in FIG. 8.

The signals on the four output lines 37-1 to 37-4 of counter 30 are inverted by inverters 56, 57, 74 and 75, and the inverted signals are supplied to the inputs of a four input NAND circuit 76 whose output is inverted by inverter 77 and supplied to one input of a two input NAND circuit 80. The other input for the NAND circuit 80 is supplied from the clock input terminal 22.

The output signals of the inverters 74 and 75 are supplied to a NAND circuit 79 whose output is connected to the second input of NAND circuit 66. The output of NAND circuit 66 is connected through an of NAND circuit 76 to one input of a two input NAND circuit 82.

The four BCD output wires 44 of the character counter 31 (FIG. 5) are connected to the four inputs of a four input NAND circuit 83 whose output is connected to the other input of NAND circuit 82.

A NAND circuit 84 has three inputs connected respectively to the output of NAND circuits 73, 80 and 82. The output of NAND circuit 84 is connected through a buffer circuit 85 to the data output terminal 24.

The NAND circuits 73, 76, 80 and 82 generate beginning and ending pulses for each signal bit. The NAND circuit 79 generates the wave form for the first quarter of each signal bit as shown in the line 79-a of FIG. 8. This is combined with the data signal in the NAND circuit 66, and that combined signal is further combined with the last character signal in NAND circuit 82. The output of NAND circuit 82 is transmitted to NAND circuit 84. The NAND circuits 76 and 80 generate a ⅛th pulse during the second one-eighth of the first bit of each character, as shown in the line 80a of FIG. 8. THE NAND circuit 73 generates the wave form at the end of each signal bit, as can be seen in line 73a of FIG. 8. This part of each bit signal is combined with the other parts in the NAND circuit 84. The output from NAND circuit 84 is transmitted through a buffer 85 to data output terminal 24. The lines 66a, 82a, and 84a in FIG. 8 illustrate the signals at the output of the respective NAND circuits for a condition of "0" signal at the input 58 of NAND circuit 66. The lines 84-2, 84-3, 84-4 and 84-5 illustrate the combined waveforms at output terminal 24 for data inputs of 1, 5, 14 and 15. Note that the last quarter of every bit is high. The first quarter of every bit except the first is low. The first eighth of the first bit is low, and the second eighth is high, as shown at 88 in FIG. 8. This high one-eighth is used as a marker pulse to identify the first bit in a word. The other data input readings between 0 and 9 can be readily generated according to the same system. The output signal for 14 illustrated in line 84-4 is an error signal and is generated at the BCD input lines 51-2 to 51-4 when no signal is received from the meter being read, as explained above. The binary 15 signal shown in line 94a is generated when the NAND circuit 83 goes negative, indicating that 15 characters have been counted by the character counter 31, to mark the last character in each word.

FIG. 9

This figure illustrates diagrammatically the circuits and other apparatus in the receiver 20 of FIG. 3. The receiver 20 includes a 24 pin connector plug illustrated diagrammatically at 21 in FIG. 3, and at 21a and 21b in FIG. 9. Only 18 of the 24 pins are connected to the electrical circuits in the receiver. When the plug 21 is connected to a receptacle 4 which has 14 active conductors in it, such as shown in FIG. 1, then only the 14 conductors cabled together shown at 88 in FIG. 9 and shown separately at 121 and 122 in FIG. 10 are connected to the transmitter 2. When the plug 21 is connected to a receptacle 4 associated with an encoder circuit as shown in FIG. 5, and diagrammatically at 15 in FIG. 3, then only the four conductors shown at 21b in FIG. 9 are connected to the encoder 15 at the meter 8.

Meter of the type shown at 1 in FIG. 1 are not hermetically sealed against the entrance of moisture into the register and transmitter mechanism. Some such meters are located in pits and other low level locations and are sometimes submerged in water or other liquid which is mixed with salt or some other contaminant and may have substantial electrical conductance. Under such conditions, all of the moving contacts 10, 11, 12 and 13 in FIG. 2 are electrically connected to ground through a conductance of indeterminate value. Their associated stationary contacts are similarly connected.

Figure 9:
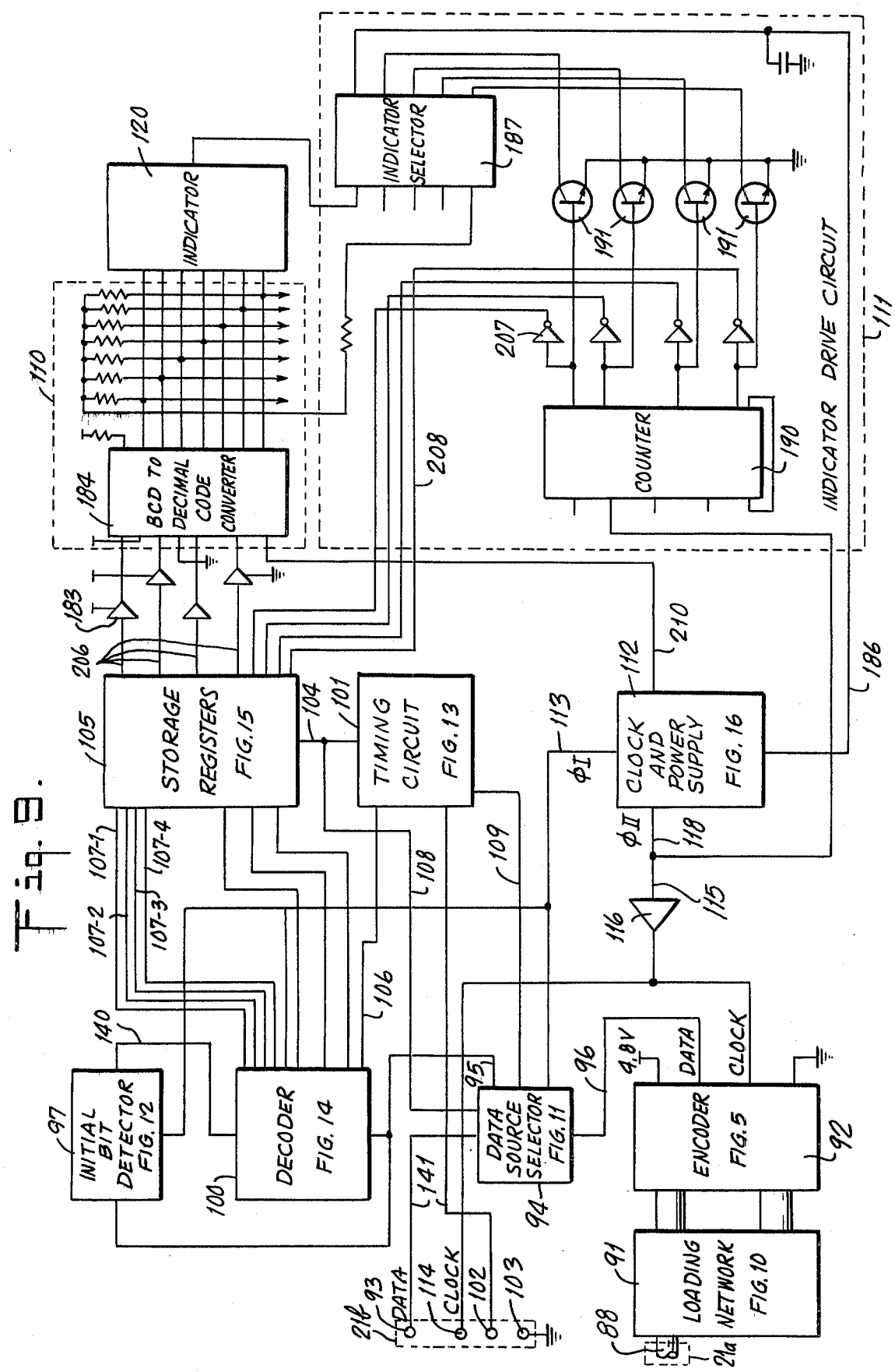
FIG. 9 is a wiring diagram of a receiver unit for reading the meters illustrated in FIGS. 1 and 2.

In order to be able to read a meter so submerged, the receiver of FIG. 9 is provided with a loading network 91 shown in detail in FIG. 10 and explained below in connection with that figure.

If the meter being read is of the type shown in FIG. 1, data enters the receiver of FIG. 9 through the loading network 91 and an encoder 92. If the meter is of the type shown in FIG. 3, with its own encoder 15, data enters the receiver through a data input terminal 93. The particular source of data to be used for the reading of any given meter is determined by a data source selector circuit 94 shown in detail in FIG. 11. If data appears at terminal 93, circuit 94 transfers that data to an output line 95. If no data appears at terminal 93, the selector 94 accepts data from the output line 96 of encoder 92 and transfers it to the line 95. The line 95 is connected to an initial bit detector 97 shown in detail in FIG. 12, and to a decoder 100, shown in greater detail in FIG. 14. The initial bit detector 97 detects the marker pulses 88 which appear in the second one-eighth of the first bit of each character in the lines 84-2 to 84-5 in FIG. 8 and synchronizes the decoder with those marker pulses.

A timing start circuit 101, shown in detail in FIG. 13, is initiated, when the receiver connector element is plugged into the transmitter, by being connected to ground through contacts 102 in the connector plug 21b, contacts 28 and 23 in the encoder 15 of FIG. 5 and contact 103 in connector element 21b. When this connection to ground is completed, the circuit 101 generates a pulse which resets the data source selector 95 to check the output of encoder 92. If no signal appears at that output, and a signal does appear at data input terminal 93, then the data from terminal 93 is selected. After a predetermined time, of the order of a few tenths of a second, the circuit 101 transmits a cutoff pulse over a conductor 108 to the data source selector 95 and also over a conductor 104 to a set of storage registers 105 shown in greater detail in FIG. 15.

A conductor 106 extends from an output of decoder 100 to the timing circuit 101. Decoder 100 terminates a pulse over conductor 106 at the end of each word, and a counter 157 in the circuit 101 counts a predetermined number of words and produces an output pulse at the end of that number of words.

The signals received by the decoder 100 are in serial BCD form and are translated by the decoder to parallel BCD form and tranferred to four output lines 107-1, 107-2, 107-3 and 107-4, which lead to storage registers 105 illustrated diagrammatically in FIG. 15. The storage registers in turn operate an indicator control circuit 110 which in turn controls indicators, one of which is shown diagrammatically at 120, supplied with power from an indicator drive circuit 111.

The entire system is supplied with power from a clock and power supply circuit 112 having a Phase I output 113 connected to the initial bit detector 97 and the data source selector 94. A Phase II output 118 of the clock 112 is connected through a conductor 115 and a buffer 116 to a clock terminal 114 on the plug 21b and a corresponding clock input terminal on the encoder 92. The circuit 112 is shown in detail in FIG. 16 and includes a rectifier 204 which supplies direct current to the indicator drive circuit 111.

FIG. 10

LOADING NETWORK

When a receiver 20, such as shown in FIG. 9, is connected to a meter installation of the type shown in FIGS. 1 and 2, then four terminals 121-1 to 121-4 are connected to the conductors 7-1 to 7-4 in FIG. 2, and thereby to the moving switch contacts 10, 11, 12 and 13 respectively. At the same time, the ten decimal output terminals 122-1 to 122-10 in FIG. 10 are connected to conductors 6-1 to 6-10 respectively in FIG. 2. In order for the receiver 20 to determine the positions of the fingers 10–13 with respect to their adjacent stationary contacts, the receiver must distinguish between a condition in which a principal switch finger, for example, finger 10, is engaging a particular stationary contact and a condition in which the switch finger is separated from that contact. When the meter is functioning under normal operating conditions, no problem exists. However, as pointed out above, such meters are occasionally subject to continued immersion in impure, possibly salt, water, so that a conductive path exists between the switch finger 10 and all 10 of its associated stationary contacts. Nevertheless, the conductive path through the water between the finger 10 and those stationary contacts which it is not engaging, has a higher resistance than the resistance between finger 10 and the stationary contact actually engaged. The network shown in FIG. 10 loads the terminals 121-1 to 121-4 and 122-1 to 122-10 so that the receiver of FIG. 4 can distinguish between: (1) the low resistance at the point of contact between the switch finger 10 and one of the stationary contacts; and (2) the relatively high resistance between the finger 10 and one of the stationary contacts which the finger is not engaging. For this purpose, each of the four terminals 121-1 to 121-4 is connected through a diode 123, a buffer 124 and a conductor 125, to a BCD-to-decimal converter such as shown at 32 in FIG. 5, and forming part of the encoder 92 of FIG.9. Each of the conductors 125 is connected through a fixed resistor 126 to a source of direct current, which may have a potential of 4.8 volts, for example. Each resistor 126 may have a high resistance, e.g., 100.K.

Each of the terminals 122 is connected through a conductor 127 to a decimal-to-BCD converter such as that shown at 33 in FIG. 5, and also forming part of the encoder 92 of FIG. 9. Each conductor 127 is connected through a fixed resistor 130 to a source of direct current which may be the same 4.8 volt source. The resistors 130 have a resistance much lower than the resistance of resistors 126, and depending on the conductivity expected to be encountered in the immersing liquid, which resistance may be, for example, 1.0K.

The interrogating signals are received from the BCD-to-decimal converter 32, and amplified by the buffers 124. Since negative going signals are employed, the diodes 123 are poled to pass such signals to the movable switch fingers 10 to 13. The circuit through the finger 10 and the stationary contact with which it is in direct engagement transmits the signal received from the terminal 121 to the selected terminal 122 with little or no loss due to the conductive liquid. The circuit through the conductive liquid in the meter, between the finger 10 and the stationary contacts which it is not engaging, has a greater resistance due to resistance of the liquid in the meter. The path through the conductive liquid to the non-selected stationary contacts is substantially shorted by the more conductive path through the engaged terminal and transmits only a relatively weak signal, if any.

Thus, the selection of a particular stationary contact by the moving switch finger 10 is effective to transmit a clearly detectable output signal to the corresponding decimal contact 122, while little or no signal is produced at the other decimal contacts. Consequently, the decimal-to-BCD converter 33 responds to signals under submerged meter conditions as well as to signals under dry meter conditions, so that the submerged meter can be successfully read.

Since the meter 8 of FIG. 3 is enclosed in an hermetically sealed housing 18, it never has its contacts shorted by liquid, and it operates without a loading network 91, even when it is submerged.

FIG. 11

THE DATA SOURCE SELECTOR

This data source selector circuit has one input 141 connected to data input terminal 93 on connector 21b (FIG. 9) and another input 96 connected to the data output of encoder 92. Data input 141 is connected through a buffer 142 and a conductor 143 to one input terminal of a gate 144. The output of the buffer 142 is also connected through an amplifier 145 to one input of a switching circuit 146.

The conductor 96 from the encoder 92 is connected to one input of a gate 147. The control terminals of the gates 144 and 147 are connected to the alternative outputs of a bistable circuit 150 which is driven from a switching circuit 146 through a conductor 151. Another input of the bistable circuit 150 is driven from a conductor 108 connected to an output of the timing circuit 101. A third input of circuit 150 is connected to an output 113 of clock circuit 112. Switching circuit 146 has another input connected through conductor 109 to an output of timing circuit 101.

The switching circuit 146 has a first stable condition in which its output signal at 151 is effective to switch the bistable circuit 150 to a condition in which gate 147 is open and gate 144 is closed, and a second stable condition in which the circuit 150 is switched to close the gate 147 and open the gate 144. Circuit 146 is switched to its first condition by a resetting input signal on conductor 109 from the timing circuit 101, which occurs shortly after a connection is completed between a transmitter and the receiver. It remains in that first condition until a signal is received on conductor 148 from input 141. Each signal appearing on conductor 148 is effective either to switch the circuit 146 to its second condition, or to hold it there. A succession of signals on 148 simply holds the circuit 146 in its second condition.

The bistable circuit 150 can be switched only when the clock signals on conductor 113 are rising. Hence, it can be switched once during each cycle of the clock signal. The bistable circuit 150 at such switching time follows the signals appearing at conductor 151 from the switching circuit 146. Conductor 108 from the timing circuit 141 of FIG. 13 transmits a restoring signal to the selector circuit 94 after the receiver has been reading data from a meter for a predetermined time long enough to receive a plurality of words, e.g., a time of the order ... of a second. See the description of the ...ing circuit 101 below. When the restoring signal is received on conductor 108, it overrides the signals appearing on conductor 151 and restores the bistable circuit 150 to a condition in which the gate 147 is open and gate 144 is closed. Bistable circuit 150 remains in that condition until another resetting signal appears on line 109.

The outputs of the gate circuits 144 and 147 are connected to the inputs of an OR circuit 152 whose output is connected through an inverter 153 to a line 95 leading to the initial bit detector 97 and to the decoder 100. A capacitor 154 is connected between the output of OR circuit 152 and ground.

Summarizing, when data is received at the input 141 from the data terminal 93, that data controls the switching circuit 146 and switches the bistable circuit 150 to open the gate 144 and pass that data through the OR circuit 152 to the output 95. When no data is received at the terminal 141, the switching circuit 146 assumes its first condition in which the bistable circuit 150 is switched to close the gate 144 and open the gate 147, thereby passing data from the input 96 through the OR circuit 152 to the output 95.

FIG. 12

INITIAL BIT DETECTOR

This detector includes a coincidence circuit 131 having one of its inputs supplied from Phase I output 113 of the clock 112 through a differentiating circuit including a capacitor 132 and a resistor 133. The other input circuit is supplied from the data output 95 of source selector 94 through another differentiating circuit including a capacitor 134 and a resistor 135.

Figure 17:
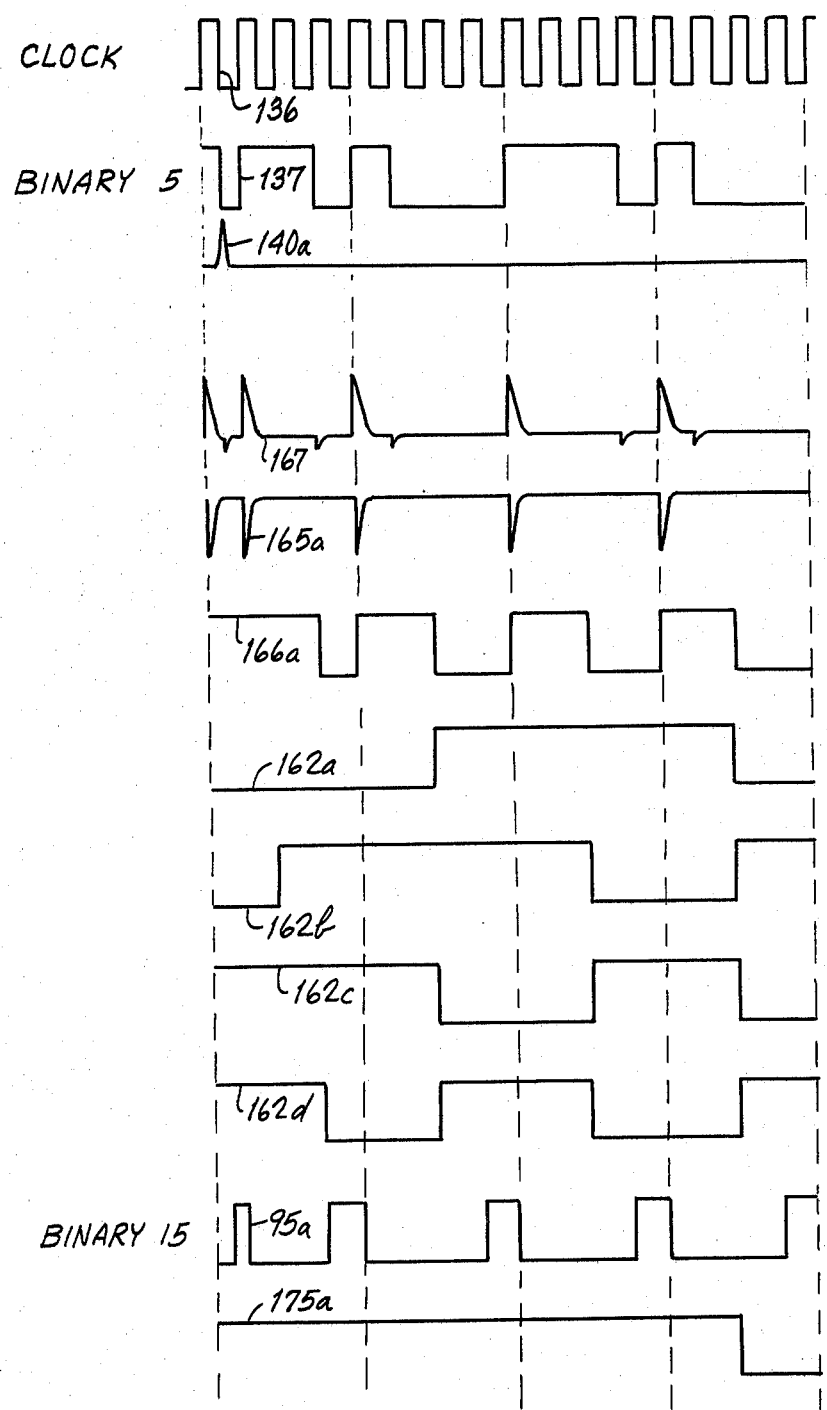
FIG. 17 is a graphical illustration of pulse signals appearing at various points in FIGS. 9-15 during operation of the receiver.

Referring to FIG. 17, it may be seen that the clock signal 136 shifts in the negative sense at a time one-eighth of the way through the initial bit of character. The input signal 137 also shifts in the negative direction at the same time because of the initial bit marker signal introduced into the serial data appearing at 88 in FIG. 8. This is the only time during any character interval when both signal 136 and the data signal 137 each swing in the negative direction at the same time. The coincidence circuit 131 detects this coincidence of negative swings and produces an output signal on the line 140 to mark the beginning of a new character in the data. This signal is transmitted to a character selector 176 in the decoder 100, as shown in greater detail in FIG. 14.

FIG. 13

DELAYED START AND RESET CIRCUIT

This circuit responds to the completion of a ground connection through terminals 102 and 103, by the connection of those terminals to terminals 23 and 28 of FIG. 5, when the receiver of FIG. 9 is plugged into the transmitter of FIG. 5. The circuit of FIG. 13 includes an RC network 155 which produces a pulse when the terminal 102 is connected to ground. This pulse is inverted by an inverter 156 and is supplied to a reset terminal of a counter circuit 157. This pulse is also supplied over conductor 109 to the switching circuit 146 in the data source selector, resetting that selector in accordance with the presence or absence of data on input line 141. If data is present on line 141, gate 144 is opened and if no data is present, gate 147 is opened, as explained above in connection with FIG. 11.

This starting pulse occurs a few milliseconds after the ground connection is completed, the time being determined by the RC network 155. The time is selected to be long enough to allow transients due to the coupling of the connector 21 to die out.

Counter circuit 157 starts counting pulses received over conductor 189 from an output of FIG. 14. As explained below these pulses count words, so that the counter 157 produces an output signal after a predetermined number of words has passed through the decoder 100. This output signal is transmitted over line 108 to restore the data source selector to its condition where it selects data from encoder 92, and also operates the storage registers 105 (FIG. 15) to lock in any data stored there and prevent further changes.

FIG. 14

DECODER

This circuit receives the serial BCD signals appearing on line 95 from data source selector 94, a sample of which representing a binary 5 is shown in line 137 in FIG. 17 (and in inverted form at line 84-3 in FIG. 8). The circuit shown in this figure decodes the serial data characters appearing on line 95 and transmits them as BCD parallel data over four lines 162-1 to 162-4 to a set of storage registers 105, four of which are shown in FIG. 15. All of the storage registers 105 receive all the BCD characters, but only one register accepts each character for storage. The particular storage register 105 selected to store a particular BCD character is also determined by the decoder of FIG. 14. The data appearing on line 95 is amplified and inverted by an amplifier 163, differentiated by an RC circuit 164 and again amplified and inverted by an amplifier 165 and transmitted to the input of a counter 166. The counter 166 receives a signal such as that shown in line 167 of FIG. 17. This signal has peaks concurrent with the positive swings which occur at the beginning of each data bit. The counter 166 counts the peaks, and hence counts the data bits, and upon every fourth data bit, recognizes the beginning of a new character and transmits a shifting pulse on an output line 170 to a shifting register consisting of two units 171a and 171b. The incoming data on line 95 is also transmitted through a line 172 to a data input of the shifting register 171a. That register has four output lines connected to the BCD output lines 162-1 to 162-4, respectively representing binary numbers 1, 2, 4 and 8. The signal on line 162-1 is also transmitted to the second unit 171b of the shifting register, so that the fourth bit appearing in register 171a is also the first bit in register 171b. Register 171b has three outputs identified by the number 173. The BCD outputs 162 and 173 are connected to a seven input AND gate 174 having an output 175 connected to the input of a character selector circuit 176, and the output 189, mentioned above, connected to an input of counter 157 in FIG. 13. The character selector circuit 176 has another input connected over conductor 140 to the output of the initial bit detector 97, shown in detail in FIG. 12.

The character selector 176 has 10 output terminals respectively numbered 177-1 to 177-10. Terminal 177-1 is a rest terminal, which is energized when the character selector circuit is inactive. The first six characters that the selector 176 receives are meter identifying characters and are transmitted to terminals 177-2 to 177-7. The next four characters represent the reading of the meter, and are utilized to turn on storage registers 105 in FIG. 15, one at a time, in sequence, to receive and store the parallel BCD data then appearing from the lines 162-1 to 162-4, which are connected to all of the storage registers 105.

The drawing shows only the storage registers 105 for the meter reading digits and only one indicator 120 for one meter reading digit. In any practical system, a complete set of meter reading digit indicators, and a similar set of storage registers and accompanying indicators for the meter identifying digits, would be employed.

Referring to FIG. 17, the signal appearing at the output 140 of the initial bit detector 97, identifying the initial bit in each character, is shown by the line 140a. The signal appearing at the output of inverter 165, identifying the beginning of each bit, is shown in line 165a.

The counter 166 (FIG. 14) counts the clock pulses from the conductor 113 (Phase I) of the clock circuit 112. The counter 166 is reset at the beginning of each bit, by the signal from the inverter 165. At the end of the second clock cycle, after each reset, the counter produces a pulse on the line 170, which is fed as a drive pulse to the shifting registers 171a and 171b. When this drive pulse reaches the shifting register 171a, it sets the state of its first bistable stage in accordance with the signal on conductor 172, which is the same as the signal on input 95. In other words, it samples the input signal halfway through each character interval. As each successive bit is received at the shifting register 171a, the data previously recorded by the shifting register first stage is advanced to the next stage, and the data from the new bit is entered in the first stage of the shifting register. If the data entering the input 95 is a binary 5, as shown in line 137 of FIG. 17, then at the end of the fourth bit, i.e., at the end of that character, the potentials on the four output lines 162-1 to 162-4, representing respectively the outputs of the four stages of the shifting register 171a will appear as shown at the end of the last clock pulse in FIG. 17, lines 162a to 162d. Note that line 162a is down, indicating a binary "1". Line 162b is up, indicating no binary 2. Line 162c is down, indicating a binary 4. Line 162d is up, indicating no binary 8. The sum of 1 and 4 is 5 so that these four signals properly indicate a binary 5.

These signals appearing on line 162 are continuously supplied to the BCD inputs of the storage registers 105.

The character selector 176 is driven by the signals at the input 140 from the initial bit detector 97. The character selector has ten outputs, including a rest output 177-1. All the outputs but one are at their down potentials at any time. The up output is transferred successively from one output terminal to the next. In the particular system described, each word interval is separated into 16 character intervals, as shown in FIG. 18. The first six intervals are used for meter identification digits, being recorded or indicated by apparatus not shown but similar to that shown below for meter reading digits. The character intervals marked 7th to 10th in FIG. 18, carry the digits of the meter reading. The next five character intervals, marked 11th to 15th in FIG. 18, are not functional in the system shown, and each of these character intervals always carries a binary 14. The last character interval numbered 16 in FIG. 18, carries a binary 15, which is used to indicate the end of a word and to reset the receiver for the beginning of the next word.

When the character selector 176 shifts the output terminal 177-8 up, indicating that the 7th character is ready for transferring to one of the storage registers 105, that storage register has its entrance gate opened by the upward shift of output 177-8 and admits the data then appearing on the lines 162 of the shifting register 171. This operation is repeated for the next three intervals, except that the output 177-9 does double duty and gates both the ninth and 10th characters, as explained below in connection with FIG. 15.

When the data on line 95 comes to the end of a word interval, the last two characters are a binary 14 and a binary 15. When this particular data combination occurs, the shifting register 171b will have all three of its outputs giving a positive identification (actually, in the system shown, the outputs will be down) indicating binary 2, 4 and 8 on those three outputs. These outputs register the binary 14 on the next to last character interval. The outputs 162 all register positive, indicating the binary 15 of the last character interval. All seven inputs of the end gate 174 are then positive, and it produces an output signal on line 175, indicating the end of the character. This signal is shown at 175a in FIG. 17, and is transferred to a reset input of the character selector 176, so as to reset that circuit to its rest condition, with output 177-1 up. The end-of-character signal at 175a is also transferred on conductor 189 to the timing circuit of FIG. 3, where it is fed as an input to the counter 157, thus noting the end of one of the predetermined number of character intervals to be used for a single meter reading before the meter reader operation is terminated.

FIG. 15

STORAGE REGISTERS

Each of the storage registers 105 has four parallel BCD input lines 162-1 to 162-4. Each also has a gate input terminal 180 connected to the signal input line from the timing circuit 101 shown in FIG. 13. The first three decimal digit storage registers shown have gate input terminals respctively connected to the conductors 177-8, 177-9 and 177-10 of the character selector 176 in FIG. 14. The fourth storage register has a gate input terminal connected through a line 181 and an inverter 182 to the output line 177-10 of the character selector 176. The character selector 176 shifts the output potential on its 177-8 output line in the positive sense at the end of the seventh character interval in a word and keeps it positive during the eighth interval. Similarly, the data appearing during the eighth and ninth character intervals are stored in the next two storage registers by the signals appearing at the ends of the eighth and ninth character intervals in the word. At the end of the tenth character, the negative swing of the potential on the 177-10 output of the character selector 176 is inverted by the inverter 182 and used to open the gate of the fourth storage register 105, so that the four storage registers receive the decimal data representing the meter reading.

INDICATOR DRIVE

FIG. 9

Each of the four storage registers 105 transmits BCD data through a set of common output lines 206 and buffers 183, to an indicator control circuit 110. The circuit 110 includes a BCD-to-indicator code converter 189 having eight output terminals connected through a decoding network 188 to a set of indicators 120, only one of which is shown. The indicators 120 may be of the conventional complementary element type, in which a selected plurality from a group of elements are illuminated simultaneously to produce a representation of a ticular digit. High voltage for the illuminated elements is received from a power supply circuit shown in FIG. 16 over a power line 186 and transmitted to an indicator selector 187 controlled by clock pulses from Phase II of the power supply 117. These clock pulses are supplied to a counter 190. The output pulses from counter 190 are amplified by transistors 191 and supplied to the four decimal digit selecting terminals of the selector 187. The selector 187 switches the high voltage from power line 186 to the several indicators 120.

The output pulses from counter 190 are also transmitted through amplifiers 207 and conductors 208 to gating terminals of the four storage registers 105. Thus, the clock sequentially selects the four storage registers 105. Concurrently with the selection of each register, a power supply circuit for the corresponding indicator 120 is selected through amplifiers 191 and the selector 187. Thereby, the digit stored in BCD data in a particular storage register is converted to the indicator code in the converter 184 and appears as a display on the selected indicator 120, thereby making the particular digit read from the meter available for recording.

The cycle of operation of counter 190 need not be, and is not coordinated with the character intervals and words of the data transmitter and receiver.

It will be readily understood that instead of a visual indicator, the data could be recorded directly on tape or in some other suitable fashion.

FIG. 16

CLOCK AND POWER SUPPLY CIRCUITS

This figure illustrates a circuit which supplies Phase I clock output signals on an output line 113 leading to the initial bit detector 97, data source selector 94 and decoder 100 (see FIG. 9), and Phase II output signals on a line 115 leading to the counter 190, the clock terminal 94 and the clock input terminal of the encoder 92. It also supplies a power output at 160 volts DC to drive the neon tube indicator 120.

The power supply includes a manual switch 192 connected to the positive terminal of a 4.6 volt DC supply, which turns on the high voltage to the neon tube indicator. This switch is connected to the center tap of the primary winding 193 of a transformer 194 and also to a conductor 210 connected to the converter 184. The terminals of primary winding 193 are connected to the collectors of transistors 195 and 196. The emitters of those transistors are connected to ground and their bases are connected through resistors 197 and 198 to the opposite terminals of an inverter 200. A resistor 201 and a capacitor 202 are connected in series across the inverter 200. Another resistor 211 and another inverter 203 are connected across the resistor 201. The terminals of the resistors 197 and 198 farthest from the transistors 195 and 196 provide the Phase II and Phase I output terminals, respectively for the clock oscillator, delivering square wave clock signals of opposite phase.

The transformer 194 has a secondary winding 195 connected to the input terminals of a rectifier bridge 204 whose output terminals are connected to conductors 185 and 205 constitute a high voltage, e.g., 160 V. D.C., power supply for the indicators 120.

All the logic circuitry described above may be constructed with CMOS technology, thereby minimizing current requirements.

While the invention has been described as applied to the reading of water meters over a transmitting link including a manually connectable coupling, it should be understood that the invention is equally applicable to other types of connections between the transmitter and the receiver, including connections over telephone or power lines or over wires, or even connections through radio links. Furthermore, many aspects of the invention are not limited to use with meters as data sources, but are applicable to other data sources as well.

I claim:
1. Apparatus for transmitting data, comprising:
   (a) a source of cyclically repeated clock pulses;
   (b) means connected to said source for transmitting data serially in characters, each character comprising a plurality of signal bits, each signal bit comprising an initial fraction and a data-carrying fraction, the duration of each of said fractions being an integral number of clock pulse cycles, said transmitting means including:
      (1) coding means for shifting the potentials of the data-carrying fractions of successive bits to a first potential to indicate a binary "0" and to a second potential to indicate a binary "1", in accordance with data to be transmitted; and
      (2) initial bit marking means for shifting the potential of the initial fraction of the first bit in each character from one of said first and second potentials to the other for a period shorter than said initial fraction.

2. Apparatus as in claim 1, in which said initial bit marking means maintains the signal at one of said potentials for a first odd integral number of half-cycles of the clock pulse source and then maintains the signal at the other of said potentials for a second odd integral number of half-cycles of the clock pulse source.

3. Apparatus as in claim 2, in which said first and second odd integral numbers are equal.

4. Apparatus as in claim 3, in which each of said first and second odd integral numbers is equal to one.

5. Apparatus as in claim 1, in which each of said initial fractions extends throughout one clock pulse cycle.

6. Apparatus for transmitting data, comprising:
   (a) receiver means, including:
      (1) a source of clock pulses;
      (2) a clock output terminal; and
      (3) a data input terminal;
   (b) transmitter means, including:
      (1) a clock input terminal;
      (2) a data output terminal; and
      (3) means for transmitting data signals to said data output terminal serially in characters, each character comprising a plurality of bits, each bit comprising an initial fraction and a data-carrying fraction, each fraction having a duration equal to a plurality of clock pulse cycles;
      (4) marking means for inserting a marker pulse in the initial fraction of the first bit of each character, each marker pulse having a duration equal to an odd integral number of half-cycles of the clock pulse source;
   (c) two transmission channels between the transmitter means and the receiver means, one connecting the clock output terminal of the receiver means to the clock input terminal of the transmitter means, and the other connecting the data output terminal of the transmitter means to the data input terminal of the receiver means; and
   (d) means in the receiver means for comparing the duration of the signals at the data input terminal and the duration of the clock pulses at the source to identify the marker pulses, and thereby the beginnings of successive characters.

7. Apparatus as in claim 6, in which:
 (a) said receiver means comprises:
  (1) first and second clock pulse terminals and phase shifting means connected between the first and second terminals for producing first and second trains of clock pulses differing in phase by 180°; and
  (2) means connecting one of said first and second terminals to said clock output terminal;
 (b) said marking means inserts a marker pulse equal in duration to one-half cycle of the clock pulse source; and
 (c) said comparing means includes coincidence means responsive to the fall times of:
  (1) the other of said first and second trains of clock pulses; and
  (2) said data signals.

8. Apparatus as in claim 7, in which said coincidence means includes:
 (a) means for differentiating the train of clock pulses at said other terminal;
 (b) means for differentiating the signals received at the data input terminal; and
 (c) means for detecting coincidence in the outputs of the two differentiating means.

9. Apparatus as in claim 6, including:
 (a) a plurality of storage means for registering the characters;
 (b) means for generating drive pulses for the storage means;
 (c) counter means for directing the drive pulses selectively to the individual storage means; and
 (d) means responsive to the marker pulses for driving the counter means.

10. Apparatus as in claim 9, including means to reset the counter means to an initial condition in which a particular storage means is selected to receive the next drive pulse.

11. Apparatus for transmitting data, comprising:
 (a) transmitter means including a plurality of digital output means for a corresponding plurality of numerical orders;
 (b) encoder means for scanning the output means in sequence, in response to the supply of electrical energy to said encoder means;
 (c) receiver means including:
  (1) a source of electrical energy;
  (2) decoder means; and
  (3) data storage means;
 (d) coupling means for connecting the receiver means to the transmitter means;
 (e) means responsive to the completion of a connection through said coupling means to transfer the data from the output means to the data storage means.

12. Apparatus as in claim 11, in which said receiver means also comprises the encoder means, said coupling means being operable to connect the encoder means to the plurality of digital output means.

13. Apparatus as in claim 11, in which said transmitter means also comprises the encoder means said coupling means being operable to connect the encoder means to the source of energy.

14. Apparatus for transmitting data, including:
 (a) transmitter means comprising:
  (1) 10 selectively energizable decimal digit lines;
  (2) means for selectively energizing the lines, one at a time;
  (3) a decimal-to-BCD converter connected to said decimal digit lines and having four binary digit output lines and a zero output line;
  (4) logic circuit means connected to all the converter output lines and having four binary digit output lines, said logic circuit means being responsive to the absence of signals on all the converter output lines to transmit signals on at least the two highest order binary digit output lines of the logic circuit means (i.e., a binary 1100 or decimal 12), and being responsive to the presence of a BCD signal on the binary digit output lines of the converter to transmit the same BCD signal on its own output lines;
 (b) receiver means, comprising a BCD-to-decimal converter, including:
  (1) four binary digit input lines operatively connectable to the output lines of the logic circuit means;
  (2) indicating means selectively operable to any of eleven possible indications including ten decimal indications and an error indication; and
  (3) means responsive to signals on the input lines for operating the indicating means to select the appropriate decimal indication in response to a binary code of 10 or less and to select the error indication in response to a binary code greater than 10.

15. Apparatus as in claim 14, in which:
 (a) said selective energizing means includes;
  (1) a plurality of order digit line sensing means, each corresponding to one of a plurality of successive numerical orders; and
  (2) means operable to actuate successively the order digit line selecting means;
 (b) said indicating means includes a plurality of order digit indicators, each capable of any of said eleven possible indications; and
 (c) said signal responsive means includes means to connect the order digit indicators successively to the BCD-to-decimal converter, so that each order digit indicator displays the decimal digit selected by a particular order digit selecting means, and if any order digit selecting means fails to produce a signal, an error signal appears on the corresponding order digit indicator.

16. Apparatus as in claim 14, including a communication channel connecting said transmitter means and said receiver means, said channel including a multiple conductor electrical connector comprising a first connector element in communication with the transmitter and a second connector element in communication with the receiver, said signal responsive means being effective to produce no indication when any of certain of the conductors of the first connector element fails to contact its counterpart in the other connector element, and to produce an error indication if any of the other conductors of said first electrical connector element fails to contact its counterpart in the other connector element.

17. Apparatus for transmitting binary data serially in characters, comprising means, including a source of cyclically repeated clock pulses, for generating, for each character, a plurality of signal bits, each bit comprising a fixed plurality of clock cycles, and including a data-carrying fraction of at least two clock cycles and at the marking fraction of at least one clock cycle, said generating means including:

(a) coding means for establishing the potential of each data-carrying fraction at a first potential to indicate a binary "0" and at a second potential to indicate a binary "1", in accordance with data to be transmitted; and (b) marking means for shifting said marking fraction at an intermediate time therein from one of said potentials to the other to mark the separation between successive characters.

18. Apparatus as in claim 17, in which:
(a) said generating means generates, for each bit, an initial marking fraction and a terminal marking fraction; and
(b) said marking means shifts only one of said marking fractions.

19. Apparatus as in claim 18, in which said marking means shifts the initial marking friction.

20. Apparatus as in claim 18, in which said generating means generates, for each bit, an initial fraction having a duration of one cycle, a data friction having a duration of a plurality of cycles and a terminal fraction having a duration of one cycle.

21. Apparatus as in claim 20, in which the initial fraction has a normal potential equal to one of said first and second potentials, and the terminal fraction has a fixed potential equal to the other of said first and second potentials, and said marking shifts the potential of said initial fraction to the other of said first and second potentials for a duration less than one cycle.

22. Apparatus for transmitting binary data serially in characters, comprising means, including a source of cyclically repeated clock pulses, for generating, for each character, a plurality of signal bits, each bit comprising a fixed plurality of clock cycles, and including a data carrying fraction of at least two clock cycles and at least one marking fraction of at least one clock cycle, said generating means including:

(a) transmitter means comprising:
(1) coding means for establishing the potential of each data-carrying fraction at a first potential to indicate a binary "0" and at a second potential to indicate a binary "1", in accordance with data to be transmitted; and
(2) marking means for shifting said marking fraction at an intermediate time therein from one of said potentials to the other to mark the separation between successive characters; and (b) receiver means for receiving signal bits from said transmitter means including means for sampling each bit at about the middle of the data-carrying fraction.

23. Apparatus as in claim 22, in which said generating means includes a source of cyclically repeated clock pulses, and each bit comprises an initial fraction having a duration of one cycle, a data fraction having a duration of a plurality of cycles and a terminal fraction having a duration of one cycle.

24. Apparatus for transmitting data, comprising:
(a) a source of data to be transmitted;
(b) a receiver for said data;
(c) electrical coupling means for completing a communication channel between the source and the receiver;
(d) time delay means;
(e) means including the time delay means for activating the source to transmit data to the receiver a determined time after completion of the communication channel by the coupling means, whereby transient effects due to operation of the coupling means die out before transmission of data begins.

25. Apparatus as in claim 24, in which:
(a) the data source is stationary;
(b) the receiver is portable and thereby subject to transients due to motion;
(c) the coupling means includes a stationary connector element and a movable connector element fixed on the receiver; and
(d) the time delay means introduces a delay long enough to allow transients due to vibration of the receiver to die out after connection of the coupling means.

26. Apparatus for transmitting data, comprising:
(a) means for transmitting decimal data in serial binary coded decimal words of 16 characters, each word including a message of less than 16 characters, each character comprising four BCD bits, and the last character in each word comprising a binary 15 (1111);
(b) receiver means for distributing the bits of each character to four parallel paths, one for each bit, said distributing means comprising a shifting register having an end input and four side outputs, one for each binary digit; and
(c) last character detecting means, comprising:
(1) an AND circuit having four inputs, one for each binary digit, and a single output;
(2) means connecting all the outputs of the shifting register to the inputs of the AND circuit, so tht said AND circuit produces a signal at its output in response to a binary 15.

27. Apparatus as in claim 26, in which:
(a) the transmitting means includes means to transmit, as the next to last character of each word, a binary 14 (1110);
(b) said shift register has seven side outputs; and
(c) said AND circuit has seven inputs connected to said seven side outputs and detects the simultaneous presence of a binary 1 at each of said seven inputs.

28. Apparatus for electrically transmitting binary data, including:
(a) electrical transmitter means operable at a relatively low electrical potential for converting the data into binary coded decimal bits;
(b) receiver means for receiving data from the transmitter means, including:
(1) indicator means operable at a relatively high electrical potential for indicating each decimal digit;
(2) means operable at said relatively low potential for converting the binary coded decimal data from the transmitter to decimal form and controlling the indicator means in response to the converted data; and
(3) power supply means for supplying both the transmitter means, the converting means, and the indicator means, said power supply means including an oscillator and means for rectifying part of the oscillator output and supplying it to the indicator means at said relatively high potential.

29. Apparatus for transmitting binary coded decimal data, comprising:

(a) means for generating words of 16 characters each, each character comprising four BCD bits;
(b) means for receiving said words and converting them to decimal data;
(c) means for storing said converted decimal data;
(d) clock means;
(e) means driven by said clock means for controlling the character intervals and the word intervals;
(f) indicator means for displaying the transmitted decimal data;
(g) means controlled by said clock means for scanning said storage means and energizing said indicator means at times asynchronous with respect to said character intervals and said data intervals.

30. Apparatus for transmitting data, including:
(a) a source of data comprising a word of predetermined duration;
(b) transmitter means for converting said data into binary bits;
(c) receiver means for converting the binary bits into decimal data;
(d) connector means for connecting the transmitter means and receiver means;
(e) timing means in said receiver means for reading the message from the data source a predetermined number of times and then cutting off the operation of the receiver means.

* * * * *

UNITED STATES PATENT OFFICE
CERTIFICATE OF CORRECTION

Patent No. 4,085,287          Dated April 18, 1978

Inventor(s) Donald J. Kullmann et al

It is certified that error appears in the above-identified patent and that said Letters Patent are hereby corrected as shown below:

Col. 6, line 45, "from" should read -- form --.

Col. 11, line 1, "1/10th" should read -- tenths --.

Col. 19, line 29, after "marking" insert -- means --.

Col. 19, lines 54-56, delete "said generating means includes a source of cyclically repeated clock pulses, and".

Signed and Sealed this

Fifth Day of September 1978

[SEAL]

Attest:

RUTH C. MASON
*Attesting Officer*

DONALD W. BANNER
*Commissioner of Patents and Trademarks*